United States Patent [19]

Goldfarb

[11] 4,164,078
[45] Aug. 14, 1979

[54] ELECTRONIC QUIZ APPARATUS

[76] Inventor: Adolph E. Goldfarb, 4614 Monarca Dr., Tarzana, Calif. 91356

[21] Appl. No.: 879,614

[22] Filed: Feb. 21, 1978

[51] Int. Cl.² ............................................. G09B 7/06
[52] U.S. Cl. .................................................... 35/9 B
[58] Field of Search ............... 35/9 R, 9 A, 9 B, 31 C

[56] References Cited

U.S. PATENT DOCUMENTS

| | | | |
|---|---|---|---|
| 1,881,242 | 10/1932 | Prentice | 35/9 B |
| 3,327,405 | 6/1967 | Ingeneri | 35/9 B |
| 3,364,597 | 1/1968 | Goodman | 35/9 B |
| 3,508,349 | 4/1970 | Gilden et al. | 35/9 B X |
| 3,626,608 | 12/1971 | Ingeneri | 35/9 B |

*Primary Examiner*—William H. Grieb
*Attorney, Agent, or Firm*—Robert M. Ashen; Robert J. Schaap

[57] ABSTRACT

An electronically operable multiple-choice response evaluating apparatus comprises a housing having a plurality of first input switches which are manually actuable to introduce a code of indicia representative of a question and a plurality of second input switches which may be manually actuated in order to introduce indicia representative of a selected one of a plurality of possible answers for a question. The housing includes electronic processing means, such as a microprocessor, which compares the code of indicia representative of the question with the indicia representative of the selected answer and determines whether or not the user selected the proper answer. The apparatus may include one or more sheets having the questions listed thereon and with the identifying code of indicia for each question. Two or more answers may be provided on the sheet with each question, and each answer will have indicia representing that particular answer. The user selects a question, uses the first input switches to introduce the code for that question, then selects the proper answer and uses the second input switch to introduce the indicia for that answer. A response mechanism will indicate whether or not the user selected the right answer. The code representative of the questions and the indicia representative of the answers are processed through an algorithm programmed into the processing means so that the relationship between the code of indicia for the question and the indicia for the answer are undiscernible to the user.

35 Claims, 3 Drawing Figures

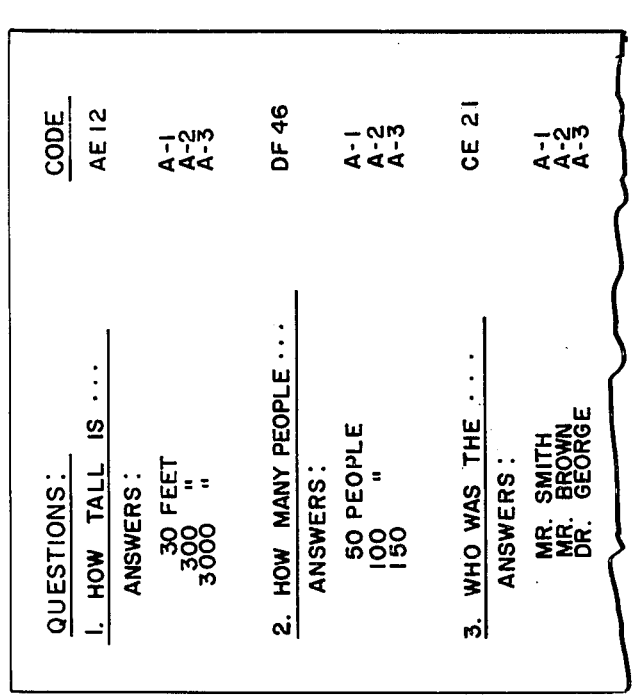
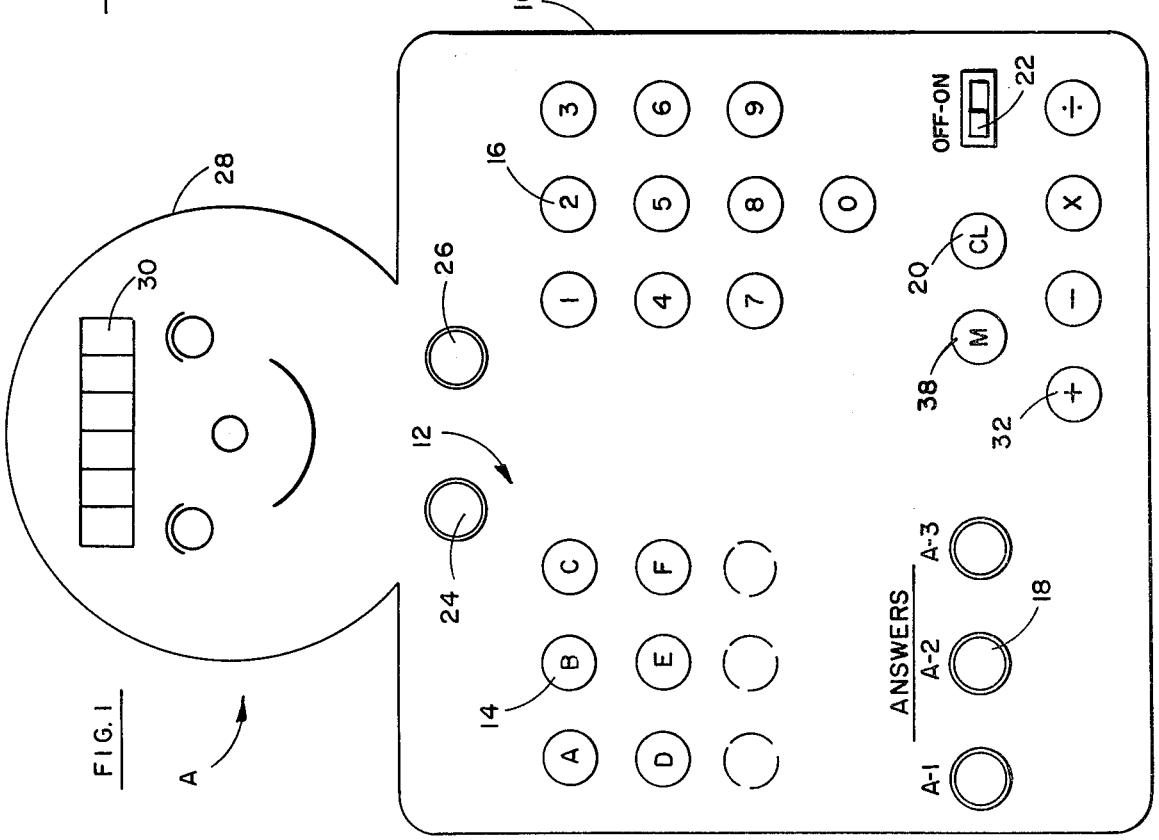

ELECTRONIC QUIZ APPARATUS

BACKGROUND OF THE INVENTION

1. Field of the Invention

This invention relates in general to certain new and useful improvements in electronically operable quiz apparatus, and, more particularly, to quiz apparatus which are capable of electronically determining if a user selected a correct answer from a plurality of given answers for a question.

2. Brief Description of the Prior Art

The prior art is replete with many forms of electronically operable calculators, including small portable desk-type calculators and hand-held calculators. In addition, many of these calculators are programmable to perform a wide variety of mathematical functions. However, in each case, the calculator is programmed so that it can only handle a finite number of questions, given the programming and the storage capacity of the calculator. Thus, the calculator may be adapted to handle questions dealing with mathematical solutions, as for example, addition or subtraction, and even questions dealing with simultaneous differential equations or the like. However, in all prior art calculators, only questions of a mathematical nature were capable of being solved such that an answer to any question was necessarily in the form of a mathematical answer.

There have also been a large number of portable and hand-held quiz devices, primarily for children, and which are capable of quizing a child user in terms of various mathematical functions. Thus, some of these devices will present a question in the form of, for example: $2+2=\_\_$, and the child user attempts to select the right answer. If the user selects the wrong answer, the apparatus will provide an indication of an improper answer. These apparatus are programmed so as to quiz children on mathematical functions in a variety of ways. Thus, for example, the apparatus may present the question: $9\div\_\_=3$. However, in each case, the apparatus is again limited to presenting questions which require mathematical answers, and, moreover, is limited by virtue of the storage capacity to a selected number of question forms which can be presented. Even moreso, in these latter devices, questions are not specifically introduced, but rather the apparatus internally generates and presents the question to the child user.

There are other forms of question and answer devices, primarily for children, and which are mechanically actuable. In these devices, a card or element having a programmed edge or portion, as for example, with notches in certain places, may be inserted into a housing, and the child user attempts to find a correct answer by actuating some mechanism on the housing. However, each card must physically interact with the housing in order to provide a determination as to whether or not the child user has selected the correct answer.

There are also apparatus in which electrical interaction between a card or similar substrate having magnetic encoded information thereon and an electronically operable device takes place. Thus, in these apparatus, information is introduced into the device by electromagnetic or similar sensing techniques. Here again, there must be some physical interaction between the substrate and the electronically operable device.

OBJECTS OF THE INVENTION

It is, therefore, a primary object of the present invention to provide a quiz apparatus which includes a sheet or other substrate having at least one question thereon and a plurality of multiple-choice answers and an electronic processing system for determining, without physical interaction with the sheet or an external element, whether or not the user selected the correct answer for a given question.

It is another object of the present invention to provide a quiz apparatus of the type stated in which the sheet includes a code of indicia relating to the question along with indicia related to two or more answers for each question, which indicia is capable of being introduced into the electronic processing system.

It is a further object of the present invention to provide an apparatus of the type stated in which the indicia relating to the question and to the answer is processed through an algorithm and the relationship between the question and answer is undiscernible to the user.

It is still a further object of the present invention to provide an apparatus of the type stated which is capable of comparing answers against questions which do not require a mathematical answer and providing a determination if such an answer has been correctly selected.

It is also an object of the present invention to provide an apparatus of the type stated which is capable of processing questions of a wide degree of difficulty along with the answers therefor, such that the apparatus can be used by children or adults. It is another salient object of the present invention to provide a method of selecting one answer from a plurality of possible answers for a given question on a sheet and introducing indicia for the question and the answer into an electronic processing apparatus in order to determine if the proper selection of an answer has been made.

It is yet another object of the present invention to provide an apparatus of the type stated which can be constructed at a relatively low cost using conventional electronic processing technology.

With the above and other objects in view, our invention resides in the novel features of form, construction, arrangement and combination of parts presently described and pointed out in the claims.

SUMMARY OF THE DISCLOSURE

A quiz apparatus which comprises an electronic processing system and a sheet containing one or more questions and a plurality of answers associated with each question. In addition, each sheet is provided with indicia representing a question and different indicia representing each of the answers.

The electronic processing system comprises a housing having an electronic processing means. The housing is also provided with a plurality of input switches thereon and which are manually actuable by the user of the apparatus in order to introduce a code of indicia corresponding to one of the questions on the sheet and to introduce indicia associated with an answer selected from a plurality of answers for that question. While one set of input switches could be used for both questions and answers, in a preferred embodiment a plurality of first input switches which are manually actuable by a user would be used to introduce indicia for a question and a plurality of second input switches which are manually actuable by the user would be provided to introduce indicia for a selected answer.

The electronic processing means generally includes an electronic processor having some storage capacity, as for example, a microprocessor. In a preferred embodiment of the invention, the microprocessor is programmed with an algorithm in order to recognize and process the indicia for each of the questions and the answers which may be introduced. The algorithm is designed to mathematically process the indicia for the question and the indicia for the answer so that there is no apparent relationship to the user between the indicia for the question and the indicia for the proper answer.

As used in this application, the term "indicia" is used in a broad sense to represent any character or symbol, mark, numeral or letter. Preferably, the indicia are numeric indicia or alpha (arabic) indicia. In like manner, when the apparatus is used as a calculator, as hereinafter described, it may be preferable to use numeric indicia or alpha-numeric indicia. In this case, the indicia represents a particular numeral or alphabetic letter. A "code of indicia" or "indicia code" as used herein represents two or more individual indicia, as for example, one numeral and an alphabetic character, e.g. B-7.

In a preferred embodiment, a question will usually be represented by a code of indicia, namely, two or more indicia or data elements. Also in a preferred embodiment, the answer may include only one indicia to represent that answer. However, in the illustrated and described embodiment, four indicia are employed as a code to represent a particular question and one indicia is used to represent an answer. However, it should be understood that a question could be represented by only a single indicia or any number of indicia in a code. The same holds true of an answer in that two or more indicia may be employed to represent an answer.

The electronic processing means will compare the indicia for an answer selected by a user for a given question against the possible choices of answers and provide a determination as to whether or not the user of the apparatus selected the correct answer. The apparatus will also include a response means associated therewith in order to provide the user with an indication of whether or not the correct answer was selected. The response means in a preferred embodiment will adopt the form of a pair of lights, such as light emitting diodes, and one of which will be energized if the user selected the correct answer and the other of which will be energized if the user did not select the correct answer.

It should be understood that any form of response could be provided. Thus, in place of lights, a screen including a number of light display elements, as for example, Nixi-tubes, could be employed in order to provide a read-out of the word "correct" or some like indication, or the read-out of the word "incorrect" or some like indication. In addition, a sound generating means could be used in place or in addition to a visual indication of a correct or incorrect answer. Thus, a sound generating mechanism connected to the microprocessor would generate a first sound if the user selected the right answer and a second sound if the user selected the incorrect answer. In addition, the microprocessor could cause the sound generating mechanism to generate sounds of amusement as well.

The apparatus of the present invention is capable of providing answers to questions which are non-mathematical in nature. Thus, for example, the questions on the sheet may be in the form of: "Who was the second President of the United States?", and the user will select an indicia of two or more given names as possible answers. The user will then introduce the indicia for the selected name into the apparatus. In this way, the apparatus can provide answers which have a non-mathematical content.

Questions can also be presented in a manner where the user selects a missing word. Thus, for example, Mr. Abraham ___ was a President of the United States, with possible answers listed as Smith A-1, Lincoln A-2 and Jones A-3. In essence, the question could adopt the form of a statement in which the user selects an answer which is the only correct response or the most correct response for the statement. Hence, the term "question" is used in a broad sense to mean any statement whether or not in the form of an interrogatory and the term "answer" is used in a broad sense to represent a response to that statement.

The electronic microprocessor is programmed with the algorithm designed so that the algorithm will recognize the identification of a code of indicia representative of a question and the identification of indicia representative of a plurality of possible answers for that question without having substantive information regarding the question or the answers programmed into the apparatus. In this way, it is possible to introduce codes for an infinite variety of questions and covering any subject matter. Even moreso, it is possible to provide questions of various degrees of difficulty. Thus, for example, the child user could be provided with questions and sets of answers relating to very simple subject matter, and an adult user could be provided with questions relating to very difficult subject matter or esoteric subject matter, such as particle physics or the like.

The amount of electronics and the logic therefor in the apparatus of the present invention is relatively small and quite simple. In addition, very little storage capacity is required. Moreover, after the algorithm has been programmed into the microprocessor, no further programming of the apparatus is required in order to handle any of the questions or answers which may be introduced therein. Consequently, it is possible to construct apparatus of this type at a relatively low cost. Moreover, question and answer sheets could be submitted to the user on a subscription or time basis so that there is a continued supply of questions and answers for the apparatus.

The algorithm in the microprocessor is designed so that it essentially performs the same mathematical process of comparing indicia for a selected answer against a code of a question. Some transformation of the input code for the question and the input indicia for the answer may take place in that the indicia for the answer and the code of indicia for a question are indiscernable to a user. However, the same procedure takes place for each question and any answer selected for that question. Consequently, the programming involved is relatively small and furthermore, the sequence storage capacity is relatively small.

The apparatus of the invention does not require any physical interaction with the sheet in order to receive information about any question or answer or to make a determination if a proper answer has been selected for a given question.

There is also no electrical interaction which may require a physical contact between a substrate and an electronic device such as an electronic or electromagnetic information transfer. Thus the sheet does not physically interact with the electronic processing system in any manner and where physical interaction is meant to include electrical, electronic magnetic or electromagnetic interaction.

The user of the apparatus can test his ability or level of knowledge with respect to certain questions. Moreover, the user may compete against himself in order to answer the question in a time frame. In addition, two or more users may compete against each other on a time basis in attempting to answer one or more of the questions in the shortest amount of time. For this purpose, the microprocessor could be programmed to be time indication for the amount of time required to answer a question.

The apparatus of the present invention may be provided with a numeric keyboard switch matrix, or otherwise, an alpha-numeric keyboard switch matrix. In addition, a read-out system, as for example, light emitting diodes or Nixi-tubes could be used in order to permit the apparatus to operate as a calculator as well. The microprocessor would be properly programmed in order to handle the desired functions, as for example, certain mathematical functions including multiplication, division, subtraction and addition. Furthermore, the housing would be provided with the input keys for performing these mathematical functions.

When an answer selected from a group of answers for a particular question is the correct answer, it is described herein as "properly corresponding" to that question. Each particular question will have indicia, and preferably a code of indicia, related thereto and which is introduced into the electronic processing apparatus. In like manner, the answer will have one or more indicia related thereto. The indicia for an answer will "properly correspond" to the indicia for a question when the microprocessor processes both the indicia for the question and the answer through the algorithm, and renders a determination that the selected answer is the only one of the answers provided which is correct or most correct.

As indicated previously, the questions and answers are set forth on a sheet which may be provided to the user of the apparatus. The sheet may adopt various forms of substrates, as for example, a single sheet of paper, a plurality of sheets of paper or pages in a booklet. Thus, the term "sheet" is used in its broad sense to represent any substrate which carries one or more questions and at least two or more answers for each of the questions along with the indicia for the answers and the indicia for the questions.

This invention possesses many other advantages and has other purposes which will be made more clearly apparent from a consideration of forms in which it may be embodied. These forms are shown in the drawings accompanying and forming part of the present specification. They will now be described in detail for the purpose of illustrating the general principles of the invention; but it is to be understood that such detailed descriptions are not to be taken in a limiting sense.

BRIEF DESCRIPTION OF THE DRAWINGS

Having thus described the invention in general terms, reference will now be made to the accompanying drawings in which:

FIG. 1 is a top plan view of a electronic quiz apparatus constructed in accordance with and embodying the present invention;

FIG. 2 is a schematic top plan view of a sheet showing a plurality of questions and answers therefor which are used with the apparatus of FIG. 1; and FIG. 3 is a schematic circuit diagram showing the connection of various components forming part of the apparatus of FIG. 1.

DETAILED DESCRIPTION OF A PREFERRED EMBODIMENT

Referring now in more detail and by reference characters to the drawings which illustrate a preferred embodiment of the present invention, A designates an electronic quiz apparatus comprising an outer housing 10 having a plurality of first input switches 12 of the push-button type. The push-button switches 12 are designed to enter the indicia for a particular question into the apparatus and, include a plurality of switches 14 having alphabetic indicia thereon and a plurality of switches 16 having numeric indicia thereon. It is not necessary to include switches with alphabetic indicia or, for that matter, switches with numeric indicia and only one set of switches, e.g. with numeric indicia or alphabetic indicia could be employed. However, in the embodiment of the invention where the apparatus A is to be used as a calculator, it is at least highly desirable to include ten switches including numeric indicia 1 through 9 and 0. In addition, it may be desirable to include certain letters of the alphabet on the push-button switches 14 having the alphabetic indicia.

Also mounted on the housing 10 are a plurality of answer switches 18 (three as shown) and which are designated as A-1, A-2 and A-3. These switches 18 may be actuated by the user of the apparatus in order to introduce indicia corresponding to a selected answer for a particular question.

The housing 10 may also be provided with a clear switch 20 in order to clear the microprocessor for further questions and subsequent answers. In addition, the housing 10 may be provided with a conventional off-on switch 22 in order to energize and de-energize the entire system.

Also mounted on the housing 10 is a manually operable push-button switch 38 designed as M and which the user of the apparatus actuates to operate in the multiple choice mode. Thus, if the apparatus functioned as a calculator as well, then the switch 38 would be desirable. However, if the apparatus did not include a calculator feature, then the switch 38 would not be required.

It should be understood that other forms of input switches could be employed. For example, it may be desirable to employ a switch which is to be actuated before each determination of whether or not the selected answer was correct or incorrect. Other switches which operate a time-keeping mechanism or the like could be employed.

The housing 10 is also provided with a pair of lights 24 and 26, preferably in the form of light-emitting diodes. One of the lights, such as the light 24, may be red or otherwise provided with nomenclature to indicate a particular answer, as for example a wrong answer. The other of the lights 26 may be green, or otherwise provided with nomenclature representing a correct answer. Thus, the red light 24 would be energized in the event of an incorrect answer and the green light 26 would be energized in the event of a correct answer.

The housing 10 could also be provided with an extension 28 having a suitable display panel 30 thereon. The display panel 30 would be primarily desirable in the event that the apparatus A is to be used as a calculator. For this purpose, the display could adopt any conventional form of light-emitting display, as for example Nixi-tubes, various forms of light-emitting diodes which will provide numeric indicia when energized, or the like. In addition, for the purposes of using the apparatus as a calculator, the housing 10 would also be provided with a plurality of switches 32, such as an add switch, a subtraction switch, a multiply switch and a divide switch, as well as other switches as may be desired including percent switches, etc. Again, in order to use the device as a calculator, it is only necessary to properly program the microprocessor to perform this additional function of calculating.

A simple schematic wiring diagram for the various components forming part of the apparatus A is more fully illustrated in FIG. 3 of the drawings. It can be observed that the various input switches, such as the switches 14 and 16, the answer switches 18 the clear switch 20 and the off-on switch 22, as well as the various lights, are all connected to a microprocessor 34. Moreover, the microprocessor is connected in common with a battery 36, the latter also being connected to the off-on switch 22. Again, the exact means for connecting various lights and input switches to a microprocessor and the connection of a battery as a source of power therefor is conventional and is therefore not described in any further detail herein.

The microprocessor 34 is of a well-known type, usually in the form of an integrated circuit chip. The technique for programming the microprocessor, as for example by programming one or more algorithms therein, are also known in the prior art. The various other components forming part of the housing, as for example, the input switches 14, 16 and 18, are all conventional in construction. In this case, an input switch can be pressed only to provide only one input signal on each actuation and must be released and pressed again before it can provide another input signal.

The other components forming part of the housing and including various retainer brackets and the like included therein in order to hold the various components, as for example, the battery 36, could all be formed of a suitable plastic material, as for example polyethylene, polystyrene, polybutadiene or the like. Again, these various plastics which form the housing and some of the components therefor could all be formed in conventional plastic molding operations, as for example, thermo-forming, injection molding, or the like. Again, other materials, as for example, metals, including aluminum or steel may also be employed for this purpose.

Also provided with the apparatus A is a sheet S, as more fully illustrated in FIG. 2 of the drawings. This sheet S can adopt any form of substrate as previously described, including a book or booklet or the like. The sheet S in this embodiment is provided with a plurality of questions along with a code identification for each question. In like manner, two or more answers (three as shown) are provided for each question and a code is also associated with each of the answers which may be selected.

Referring again to FIG. 2, the sheet S represents a group of questions which would be primarily designed for a child including questions, as for example: (1) How tall is... the Washington Monument. The code number for this particular question has four indicia, namely, AE-12 as shown. In this case, three possible answers are provided which include 30 feet, 300 feet and 3000 feet. Again, the user merely selects the proper indicia for the answer, namely, A-1, A-2 or A-3, and actuates the proper answer switch 18.

In this embodiment of the invention, it can be observed that a four indicia code is used to introduce a question and the code comprises two alphabetic characters and two numeric characters. While the answers are shown as having indicia A-1, A-2 or A-3, it can be observed that this is a single indicia, although depending on the construction of the microprocessor, two or more indicia for the answer could be used. Moreover, it can be observed that with three answers for each question, the first answer for each of the questions will always have the same input indicia, the second will have the same input indicia and the third will have the same input indicia.

As indicated previously, the apparatus of the present invention is unique in that it is capable of providing answers wich are not necessarily mathematical in nature, although it can provide answers which are based on mathematical questions. In addition, with a relatively small storage capacity, it is possible to handle an almost infinite variety of questions. Thus, for example, the manufacturer of the device will of course know the algorithm which is used in the microprocessor. Thus, it is possible for the manufacturer to prepare all forms of questions on a periodic basis and send these questions to the purchaser of the apparatus. By merely knowing the algorithm, it is possible to generate a question and the answers for that question without the substantive matter of the questions or answers having been programmed into the microprocessor.

Each of the alphabetic characters which are used as a code of indicia for the question are assigned a numeric value. Thus, when a four-digit code is introduced with a certain numeric value, it is processed by the algorithm; that is, for example, it may be divided by e.g. 7, multiplied by e.g. 9, and the remainder added to a specific number, e.g. 4, and which is divided by another number, as for example 5. The remainder of the mathematical process may then represent the particular answer. Thus, if the remainder is "1", it will represent the first answer A-1, and if the remainder is "2", it will represent the second answer A-2, and if the remainder is three or more, it will represent the third answer A-3. In this way, the manufacturer of the device will always know which input code to use in order to generate the proper answer.

It should be observed that while a four indicia code is used for the question, any number of indicia could be used for the question, as for example, a two indicia code, a three indicia code, a five indicia code, etc. The same holds true for the answer in that a two indicia code, a three indicia code, etc., could also be used to introduce the answer.

In addition to the above, it is also possible to use a sound generating mechanism along with the light display. In this way, a certain sound could be generated when the light 24 is energized and a different sound could be generated when the light 26 is energized. The inclusion of a speaker connected to the microprocessor is a relatively simple expedient and can be employed if desired.

Thus, there has been illustrated and described a unique and novel quiz apparatus which electronically determines if an answer selected from a plurality of answers for a given question was correct or incorrect, and which therefore fulfills all of the objects and advantages sought therefor. It should be understood that many changes, modifications, variations and other uses and applications of the quiz apparatus will become apparent to those skilled in the art after considering this specification and the accompanying drawings. Therefore, any and all such changes, modifications, variations and other uses and applications which do not depart from the nature and spirit of the invention are deemed to be covered by the invention which is limited only by the following claims.

Having thus described my invention, what I desire to claim and secure by letters patent is:

1. A quiz apparatus comprising:
   (a) sheet means having one or more questions and a plurality of answers to the question, said sheet means also having input indicia for an electronic device related to the question and input indicia for an electronic device related to each answer,
   (b) a relatively small and portable electronically operable device having a housing,
   (c) input means on said housing manually operable for introducing indicia representative of the question and of the answers so that the user may introduce the indicia from the sheet means representative of the question and of a selected one or more of a larger possible number of answers for that question,
   (d) electronic processing means associated with the housing being operatively connected to said input means for processing the indicia for the question and for the selected answer in connection with an algorithm, to determine the relationship of the selected answer to the correct answer to the question, and where the correlation of the indicia for the question and the answers thereto are not readily discernible to the user of the apparatus, and
   (e) response means to provide an indication to the user of the relationship of the answer selected by the user to the correct answer.

2. The apparatus of claim 1 further characterized in that said input means comprises a first input means for introducing indicia representative of a question and a second input means for introducing indicia representative of an answer.

3. The apparatus of claim 2 further characterized in that the algorithm is designed so that the electronic processing means requires only limited storage capacity to compare indicia for questions and indicia for answers and where the substantive information of the question and answer therefor is not programmed.

4. The device of claim 2 further characterized in that said first input means comprises a plurality of first manually operable switches for introducing different indicia in a code representative of a question.

5. The device of claim 4 further characterized in that said second input means comprises a plurality of second manually operable switches and each of which introduces a different indicia representative of a different answer.

6. The apparatus of claim 1 further characterized in that said response means comprises a first light representative of a correct answer when energized in response to a signal from said processing means and a second light representative of an incorrect answer when energized in response to a signal from said processing means.

7. The apparatus of claim 1 further characterized in that there are a plurality of questions and a different individual multiple-element code of said indicia is representative of each question.

8. The apparatus of claim 7 further characterized in that the indicia for the answers and the questions is numeric indicia or alpha indicia or alpha-numeric indicia.

9. The apparatus of claim 1 further characterized in that said housing is provided with a display panel and that said processing means is capable of handling numeric indicia so that said device can operate as a mathematical calculator.

10. The apparatus of claim 1 further characterized in that said electronic processing means processes each indicia representing a question in accordance with a programmed algorithm so that there is no discernible relationship to the user of the apparatus between the input indicia representing the question and the indicia representing the answers, said electronic processing means being adapted to have a large number of indicia representing questions introduced and which can be processed in accordance with the algorithm so that the processing means can identify the indicia representing the question and indicia representative of an answer therefor without having the questions or answers programmed therein.

11. A question and answer apparatus comprising:
   (a) sheet means including a plurality of questions with a code of indicia representative of each question, and a plurality of answers for each question with indicia representative of each answer,
   (b) a relatively small and portable electronically operable device having a housing,
   (c) input means on said housing for manually introducing a code of two or more indicia representative of a question which does not necessarily require a mathematical answer and where the introduced code of indicia representing the question correlates to the code of indicia for that question on said sheet means, said input means also being adapted for introducing indicia representative of each of said answers and where the introduced indicia of a selected answer correlates to the indicia for that selected answer on said sheet means,
   (d) electronic processing means associated with said housing for receiving the code of indicia for the question and the indicia for a selected answer and determining if the indicia representing the answer properly corresponded with the code of indicia representing the question and capable of making such determination with indicia representing non-mathematical answers, and
   (e) response means operatively connected to said processing means to provide indication of a correct answer if the indicia representing the answer properly corresponded with the code indicia representing the question, or an indiciation of an incorrect answer if the indicia representing the answer did not properly correspond with the code of indicia representing the question, so that the user of the apparatus if informed of whether or not the proper answer was selected.

12. The apparatus of claim 11 further characterized in that said input means comprises a first input means and a second input means, and said first input means comprises a plurality of first manually operable switch means for introducing different indicia in a code representative of a question.

13. The apparatus of claim 12 further characterized in that said second input means comprises a plurality of second manually operable switch means and each of which introduces a different indicia representative of a different answer.

14. The apparatus of claim 11 further characterized in that said response means comprises a first indicator representative of a correct answer and a second indicator representative of an incorrect answer.

15. The apparatus of claim 11 further characterized in that said response means comprises a first light representative of a correct answer when energized in response to a signal from said processing means and a second light representative of an incorrect answer when energized in response to a signal from said processing means.

16. The apparatus of claim 11 further characterized in that there is a different code of said indicia representative of each question.

17. The apparatus of claim 16 further characterized in that the indicia for the answers and the questions is numeric indicia or alpha indicia or alpha-numeric indicia.

18. The apparatus of claim 1 further characterized in that said housing is provided with a display panel and that said processing means is capable of handling numeric indicia so that said device can operate as a mathematical calculator.

19. The apparatus of claim 11 further characterized in that said electronic processing means processes each code of indicia representing a question in accordance with a programmed algorithm so that there is no discernible relationship to the user of the apparatus between the input code of indicia representing a question and the indicia representing any of the answers to that question, said electronic processing means being adapted to have a large number of codes of indicia representing questions introduced and which can be processed in accordance with the algorithm so tht the processing means can identify the code of indicia representing a question and indicia representative of an answer therefor without having the questions or answers programmed therein.

20. An apparatus capable of providing information in response to inquiries, said apparatus comprising:
(a) a relatively small and portable electronically operable device having a housing,
(b) first input means on said housing for manually introducing a different code of indicia representative of each different inquiry,
(c) second input means on said housing for manually introducing different indicia representative of any selected one or more of a larger possible number of different answers for each inquiry,
(d) electronic processing means associated with said housing for receiving the code of indicia from the first input means and the indicia from said second input means and determining if the indicia representing the selected answer properly corresponds with the code of indicia representing the associated inquiry, said electronic processing means processing each code of indicia representing an inquiry in accordance with a programmed algorithm so that there is no discernible relationship to the user of the apparatus between the input code of indicia for the inquiry and any of the indicia for the possible answers to that inquiry, said electronic processing means being adapted to have a large number of codes of indicia representing inquiries introduced so that the apparatus can deal with inquiries of infinite variety without having substantive material relating to the inquiries or answers programmed therein, and
(e) response means operatively connected to said electronic processing means to provide indication of a correct answer if the indicia which represents the selected answer properly corresponded to the code of indicia which represents the inquiry, or an incorrect answer if the indicia which represents the selected answer did not properly correspond to the code of indicia which represents the inquiry, so that the user of the apparatus is informed of whether or not the proper answer was selected.

21. The apparatus of claim 20 further characterized in that said apparatus is capable of making a determination of whether an indicia representing an answer properly corresponded to a code of indicia representing an inquiry when the answer represents a non-mathematical answer.

22. The apparatus of claim 20 further characterized in that said apparatus is a hand held apparatus.

23. The apparatus of claim 20 further characterized in that:
(a) said first input means comprises a plurality of first manually operable switch means for introducing different indicia in a code representative of a question, and
(b) said second input means comprises a plurality of second manually operable switch means and each of which introduces a different indicia representative of a different answer.

24. The apparatus of claim 20 further characterized in that response means comprises a first indicator representative of a correct answer and a second indicator representative of an incorrect answer.

25. The apparatus of claim 20 further characterized in that said response means comprises a first light representative of a correct answer when energized in response to a signal from said processing means and a second light representative of an incorrect answer when energized in response to a signal from said processing means.

26. The apparatus of claim 20 further characterized in that said apparatus comprises a sheet means including one or more questions with a code of indicia representative of each question, a plurality of answers for each question on said sheet means and an indicia representative of each answer, so that the user of the apparatus selects a question on said sheet means and introduces the code for that question and thereafter selects an answer from the plurality of answers for that question and introduces the indicia for the selected answer.

27. The apparatus of claim 26 further characterized in that the indicia for the answers and the questions is numeric indicia or alpha indicia or alpha-numeric indicia.

28. The apparatus of claim 20 further characterized in that said housing is provided with a display panel and that said processing means is capable of handling numeric indicia so that said device can operate as a mathematical calculator.

29. A relatively small and portable apparatus capable of providing information in response to input questions, said apparatus comprising:
(a) a housing, (b) a plurality of first manually actuable input switches with each switch representing a different indicia so that said switches can be actuated by a user to introduce a code of indicia representative of a question, (c) a plurality of second manually actuable input switches with each representing a different indicia relating to a question, so that said second input switches can be actuated by a user to introduce an indicia representative of a selected answer for that question, (d) electronic processing means located within said housing and being operatively connected to said plurality of first input switches and plurality of second input switches, said electronic processing means receiving signals corresponding to the code of indicia from the first input switches when actuated and determining by means of an algorithm programmed therein if the code of indicia representing a question properly corresponds with the indicia representing the selected answer to that question, said electronic processing means being capable of providing non-mathematical answers to questions having non-mathematical content by virtue of said algorithm, there being no discernible relationship to the user of the apparatus between the input code of indicia representing a question and any of the indicia representing the possible answers to that question, said electronic processing means being adapted to have a large number of codes of indicia representing questions introduced to that the apparatus can deal with inquiries of infinite variety without having substantive material related to the questions or answers programmed therein, (e) a first response light operatively connected to said electronic processing means and being energized if the indicia representing the selected answer properly correspond with the code of indicia representing the question, (f) a second response light operatively connected to said electronic processing means and being energized if the indicia representing the selected answer does not properly correspond with the code of indicia representing the question, (g) a manually operable clear switch on said housing and being operatively connected to said electronic processing means to clear that portion of the processing means for introduction of code of indicia representative of a new question and indicia representative of a new answer, and (h) sheet means including a plurality of questions and code of indicia relating to each question and where the codes of indicia representing the questions on said sheet means are the codes of indicia which can be introduced by a user actuating at least two of the first manually actuable input switches, said sheet means also including two or more possible answers for each question and an indicia relating to each answer and where the indicia representing an answer selected by the user can be introduced by the user actuating at least one of the second manually actuable input switches.

30. The apparatus of claim 29 further characterized in that said housing of said apparatus is a hand-held housing.

31. The apparatus of claim 29 further characterized in that the indicia for the answers and the questions is numeric indicia or alpha indicia or alpha-numeric indicia.

32. The apparatus of claim 29 further characterized in that said housing is provided with a display pannel and that said processing means is capable of handling numeric indicia so that said device can operate as a mathematical calculator.

33. The apparatus of claim 29 further characterized in that the algorithm is programmed so that the electronic processing means requires only limited storage capability to compare codes of indicia for questions and indicia for answers and where the substantive information of the questions and answers there is not programmed.

34. A quiz apparatus comprising:
(a) sheet means having a plurality of questions and a plurality of answers to each of the questions, said sheet means also having an input code of two or more indicia related to each of the questions and input indicia related to each answer, (b) a relatively small and portable electronically operable device having a housing, (c) input means on said housing for manually introducing the code of indicia representative of said questions and the indicia representative of said answers, so that the user may introduce the code of indicia representative of a question and the indicia representative of a selected answer for that question without any physical interaction between said sheet means and said housing, (d) electronic processing means associated with the housing being operatively connected to said input means for processing the code of indicia for the question and the indicia for the selected answer in connection with a programmed algorithm, and comparing the selected answer with a correct answer to the question, there being no discernible correlation between the code of indicia for any question and the indicia for the answers thereto, and (e) response means to provide an indication of the relationship of the answer selected by the user to said correct answer.

35. A method of determining whether or not a correct answer has been selected for a given question in an electronic processing system, said method comprising:
(a) providing a plurality of questions to be answered with each question having an associated code of indicia, (b) selecting one of said questions, (c) introducing a code of indicia for the selected question into an electronic processing apparatus by manually actuating a plurality of input switches, (d) providing a plurality of possible answers for each question, and with each answer for a question having a different associated indicia, the relationship of the code of indicia for a question and the indicia for the possible answers thereto being undiscernible to a user, (e) selecting an answer to the selected question, (f) introducing the indicia for the selected answer by manually actuating at least one input switch, (g) electronically processing the code of indicia for the selected question and the indicia for the selected answer in connection with an algorithm to compare the selected answer to the correct answer to the question, and (h) providing an indication of whether the user selected the correct answer.

* * * * *

Disclaimer 4,164,078.—*Adolph E. Goldfarb*, Tarzana, Calif. ELECTRONIC QUIZ APPARATUS. Patent dated Aug. 14, 1979. Disclaimer filed Jan. 14, 1980, by the inventor.

Hereby enters this disclaimer to claims 11–18 inclusive of said patent.

[*Official Gazette, March 18, 1980.*]